United States Patent
Keuffer et al.

(10) Patent No.: US 10,490,001 B2
(45) Date of Patent: Nov. 26, 2019

(54) PROCESS FOR VERIFICATION OF AN ACCESS RIGHT OF AN INDIVIDUAL

(71) Applicant: Safran Identity & Security, Issy-les-Moulineaux (FR)

(72) Inventors: Julien Paul Keuffer, Issy les Moulineaux (FR); Herve Chabanne, Issy les Moulineaux (FR); Roch Lescuyer, Issy-les-Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 200 days.

(21) Appl. No.: 15/614,461

(22) Filed: Jun. 5, 2017

(65) Prior Publication Data
US 2017/0352209 A1 Dec. 7, 2017

(30) Foreign Application Priority Data

Jun. 6, 2016 (FR) ...................................... 16 55159

(51) Int. Cl.
*G06K 9/00* (2006.01)
*G07C 9/00* (2006.01)
(Continued)

(52) U.S. Cl.
CPC ......... *G07C 9/00158* (2013.01); *G06F 21/32* (2013.01); *G06Q 10/00* (2013.01);
(Continued)

(58) Field of Classification Search
None
See application file for complete search history.

(56) References Cited

U.S. PATENT DOCUMENTS

| 8,925,058 B1 | 12/2014 | Dotan et al. |
| 2009/0164798 A1 | 6/2009 | Gupta |
| 2018/0160959 A1* | 6/2018 | Wilde ...................... A61B 5/16 |

OTHER PUBLICATIONS

European Search Report, dated Jul. 5, 2017, European Application No. EP17174171.

(Continued)

*Primary Examiner* — Randolph I Chu
(74) *Attorney, Agent, or Firm* — Womble Bond Dickinson (US) LLP

(57) ABSTRACT

The invention proposes a verification process of an access right of an individual comprising conducting the following steps before the individual presents themselves at a control point, of:
acquisition, by a client device, of a biometric datum on the individual, and transmission of said datum to a remote calculation server,
performing a zero-knowledge calculation protocol verifiable publicly by the remote calculation server, comprising:
calculation of a function comprising a remote calculation between the biometric datum and each of a plurality of reference data, comparison of each distance to a predetermined threshold, and generation of a result indicating whether at least one of the distances calculated is under said threshold,
generation, from said function, of proof of exactness of calculation of the function,
transmission via the remote calculation server of the result of calculation of the function and proof of exactness of the calculation to the client device,
and the process comprises conducting the following steps, when the individual presents themselves at the control point:
transmission by the client device of the datum acquired on the individual, of the result of calculation and proof to a processing unit of a control authority,
(Continued)

Figure 1:
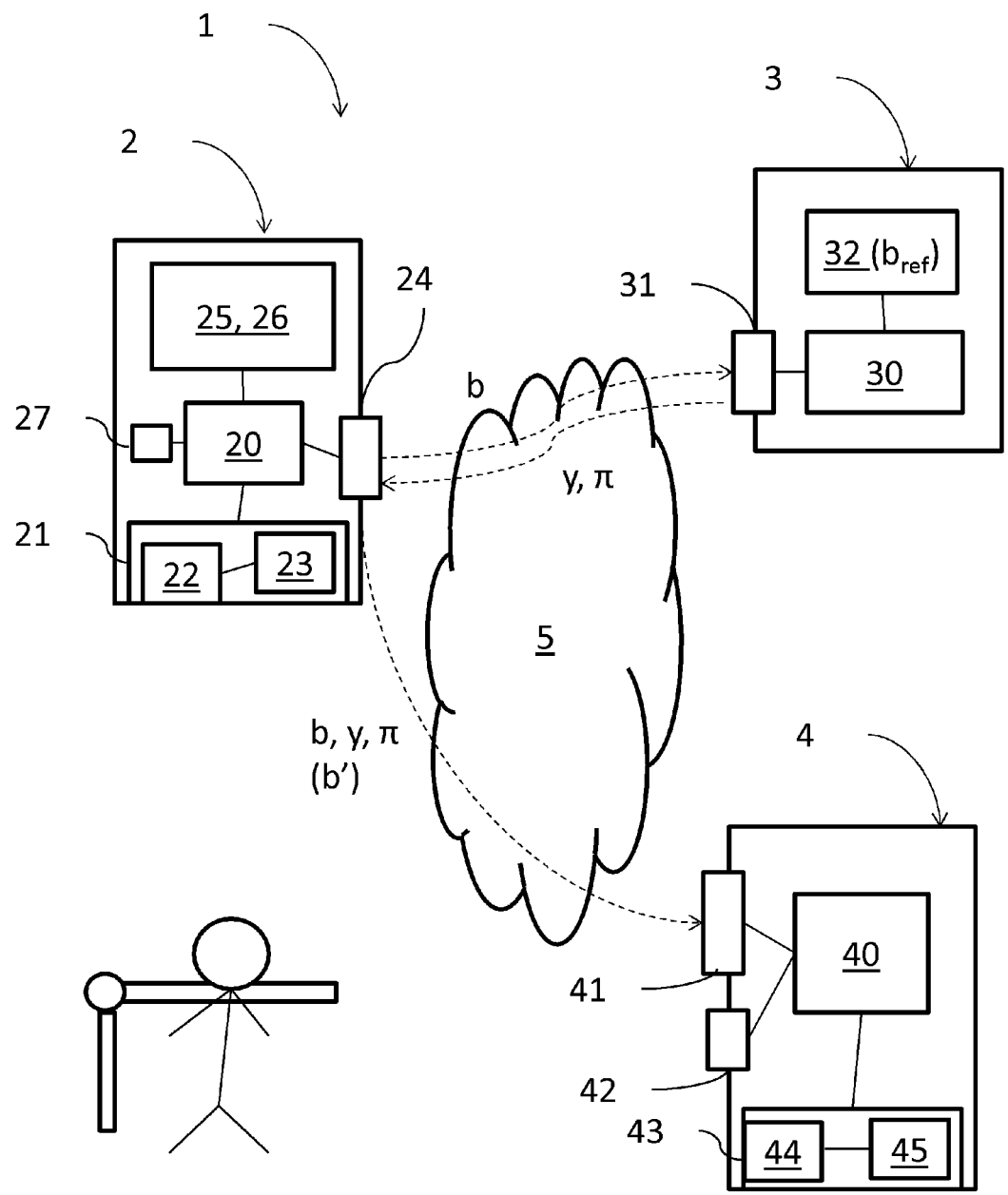

verification by the processing unit of the exactness of the result, from the proof.

10 Claims, 2 Drawing Sheets

(51) Int. Cl.
    *G06F 21/32*     (2013.01)
    *H04L 29/06*     (2006.01)
    *G06Q 10/00*     (2012.01)
    *H04L 9/32*     (2006.01)
    *G06Q 50/26*     (2012.01)
    *H04W 12/06*     (2009.01)

(52) U.S. Cl.
    CPC ....... *G06Q 50/265* (2013.01); *G07C 9/00563* (2013.01); *G07C 9/00571* (2013.01); *H04L 9/3218* (2013.01); *H04L 9/3231* (2013.01); *H04L 63/0861* (2013.01); *G06K 9/00006* (2013.01); *H04W 12/06* (2013.01)

(56) References Cited

OTHER PUBLICATIONS

French Search Report and Written Opinion, dated Dec. 8, 2016, French Application No. FR1655159.
Bringer, Julien, et al., "Some Application of Verifiable Computation to Biometric Verification", 2015 IEEE International Workshop on Information Forensics and Security (WIFS), Nov. 16, 2015, 6 pages.
Costello, Craig, et al., "Geppetto: Versatile Verifiable Computation", International Association for Cryptologic Research, vol. 20141201:093827, Dec. 1, 2014, 22 pages.

\* cited by examiner

PROCESS FOR VERIFICATION OF AN ACCESS RIGHT OF AN INDIVIDUAL

FIELD OF THE INVENTION

The invention relates to a verification process of an access right of an individual to a zone delimited by a control point managed by a control authority. The invention applies especially to verification of the right of an individual to cross a border and/or board transport means.

PRIOR ART

When an individual boards a means of transport, typically an aircraft, it is known that the individual registers for the flight they will take, then passes through at least one control point during which their identity is verified by a control authority such as the airline company in charge of the flight to verify their right to board. A customs authority may also verify the identity if the individual's trip involves crossing a border.

This verification can be carried out by searching for correspondence between a biometric datum generated from a biometric trait of the individual, and a plurality of biometric reference data, corresponding typically to the individuals registered for the flight.

At the end of this search for correspondence, the individual can be formally identified, that is, their identity is determined—in this case biometric identification. As a variant, it can suffice to obtain information according to which the individual corresponds to at least one of the people from whom the biometric reference data originate, without the exact identity of the individual having been determined, so that the individual is considered as having the right to pass through the control point.

The comparison of biometric data of an individual during access control, even though advantageous from the security viewpoint, can prove time-consuming.

For example, some of the most recent and most effective techniques comprise the use of networks of neurones to generate from a facial image of an individual a biometric datum, in the form of a vector. The vector is then compared to another biometric datum by calculation of a scalar product between the vectors corresponding to both biometric data and comparison of the result relative to a predetermined threshold.

This must be repeated for comparing a datum of an individual to all biometric reference data to which it must be compared.

But forecasting aerial traffic as it grows constantly over the coming years is prompting questions on the capacity of airports to manage this traffic. Despite this growth, there are in fact plans to reduce wait lines and delays at checkpoints for passengers, and maintain proper data security.

The increasingly widespread development of personal electronic devices, such as mobile telephones or tablets, among passengers would encourage moving the time-consuming step of biometric comparison upstream of passing through the control point by an individual, by conducting this step using their personal electronic device.

However, the processing power of such a device can prove inadequate for the latter to perform the biometric comparison operation in a time acceptable by the user.

Also, there is the question of confidentiality of data that are handled during comparison. It is also necessary to provide control authority with sufficient guarantees on the reliability and exactness of the calculation made for passing through the control point.

There is therefore a need for an access control process that includes the comparison of biometric data, that reduces the time taken to pass through a control point by an individual, and that is acceptable to the individual, while also delivering sufficient safety guarantees to the control authority.

PRESENTATION OF THE INVENTION

The aim of the invention is to rectify the problem explained hereinbefore.

In this respect, it is proposed a verification process of an access right of an individual to a zone delimited by at least one control point managed by a control authority, characterised in that it comprises conducting the following steps before the individual presents at the control point:
  acquisition by a client device of a biometric datum on the individual, and transmission of said datum to a remote calculation server,
  executing a zero-knowledge calculation protocol which is verifiable publicly, the calculation protocol comprising:
    calculation of a function comprising a remote calculation between the biometric datum acquired on the individual and each of a plurality of biometric reference data, comparison of each distance with a predetermined threshold and generation of a result indicating whether at least one of the distances calculated is under said threshold, and
    generation from said function of proof of exactness of the calculation of the function,
  transmission by the remote calculation server of the result of calculation of the function and proof of exactness of the calculation to the client device,
and the process comprises conducting the following steps, when the individual presents themselves at the control point:
  transmission by the client device of the biometric datum acquired on the individual, of the result of the calculation of the function and proof of exactness of calculation to a processing unit of control authority, and
  verification, by the processing unit of control authority, of the exactness of the result, from said result, of the biometric datum and proof.

Advantageously, though optionally, the process according to the invention can also comprise at least one of the following characteristics:
  control authority can authorise passing through the control point by the individual if the result of the calculation of the function is exact.
  the zero-knowledge calculation protocol publicly verifiable can be the protocol called Pinocchio or the protocol called Gepetto.
  the process can also comprise a preliminary enrolment step during which the client device sends to the remote calculation server at least one identity datum of the individual and one biometric datum of the individual certified by control authority, and the calculation server registers the biometric datum of the individual as biometric reference datum.
  the process can also comprise performing at least one security verification from the identity datum of the individual and/or of the biometric datum of the individual obtained from the identity document.
  the transmission step of the biometric datum acquired on the individual at the remote calculation server can be conducted securely.

the control authority can be a customs authority or a transport company.

when the individual presents themselves at the control authority's control point, the process can also comprise a step during which the processing unit of control authority acquires a biometric datum on the individual and compare said datum to the datum sent by the client device, the verification step of the result of the calculation of the function being conducted only if said data correspond.

Another aim of the invention is a verification system of an access right of an individual, comprising:

a calculation server, comprising a computer and a remote communications interface, the computer being adapted to calculate a function comprising a remote calculation between at least two biometric data, and comparison of each distance to a predetermined threshold, and to generate proof of exactness of the calculation of the function, a processing unit adapted to perform verification of calculation of the function from the proof of exactness and the result of the calculation, and a client device, adapted to acquire a biometric datum on an individual and to communicate with the calculation server and the processing unit, said system being adapted to execute the process according to the above description.

According to another object, the invention also relates to a computer program product, comprising code instructions for executing a process comprising steps of:

acquisition of an image of a biometric trait and generation from said image of a biometric datum, transmission to a remote server of said biometric datum, receipt of a calculation result of a function by the remote server and proof of exactness of the result, and transmission of the biometric datum, the calculation result and proof to a processing unit, when it is executed by a computer.

The proposed invention reduces the time taken for an individual to pass through a control point by moving a comparison step of a biometric datum of the individual to reference data upstream of passing through this control point. Performing the calculation by means of a publicly verifiable zero-knowledge protocol allows to ensure that this comparison is made reliably and securely and to enable the control authority to verify the result of the calculation.

Also, performing the calculation and proof of exactness of the calculation by a remote server can make use of greater processing power than that of an electronic device personal to the individual passing through the control point. This also does not mobilise this electronic device throughout calculation, and therefore does not hinder the individual.

PRESENTATION OF FIGURES

Figure 2:
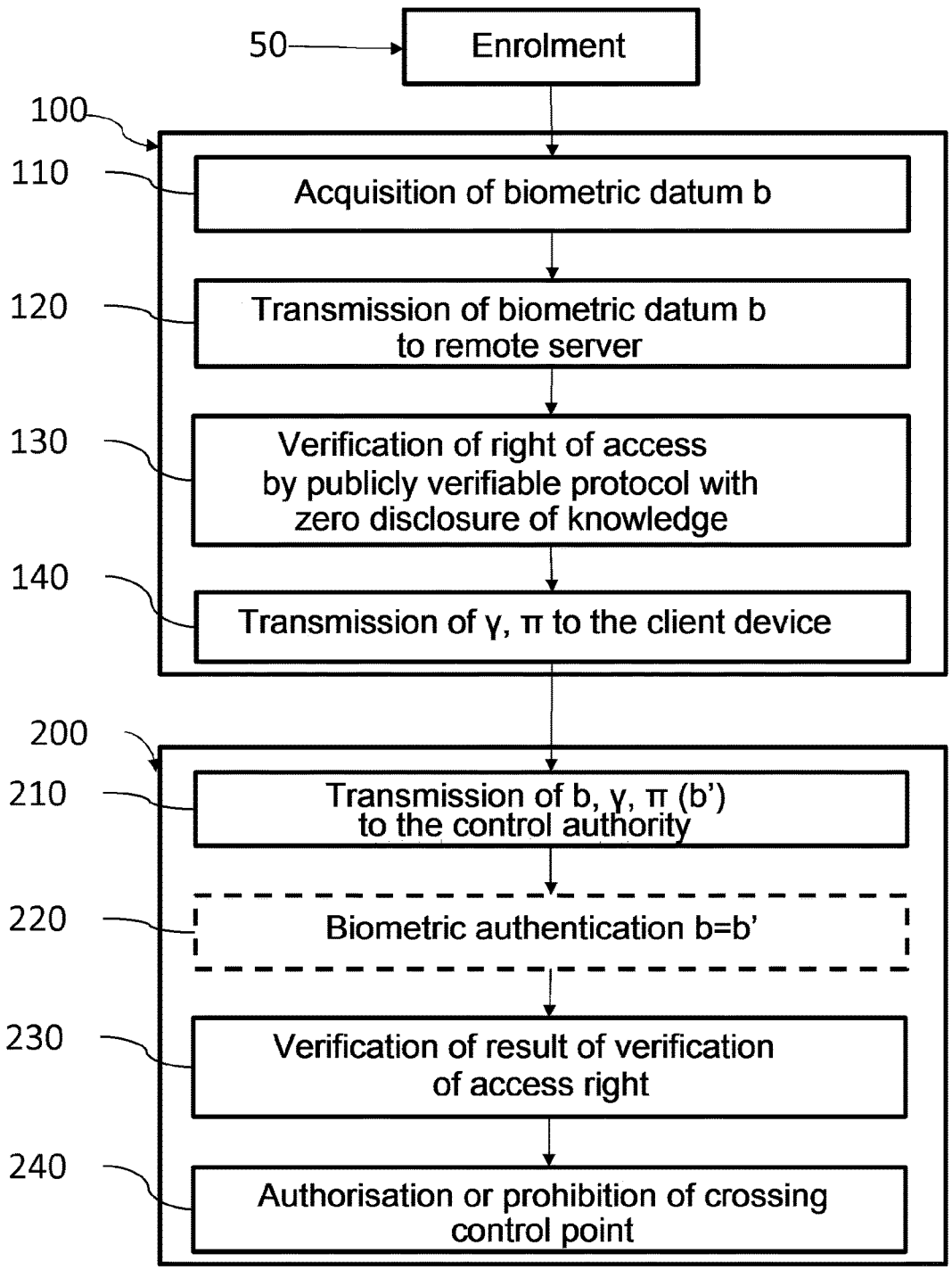

Other characteristics and advantages of the present invention will emerge from the following description of a preferred embodiment. This description will be given in reference to the attached diagrams, wherein:

FIG. 1 schematically illustrates a system for access control of an individual in the context of executing a process of access control, FIG. 2 schematically illustrates the main steps of a process of access control of an individual.

DETAILED DESCRIPTION OF AT LEAST ONE EMBODIMENT OF THE INVENTION

In reference to FIG. 1, this schematically illustrates a system of access control 1 of an individual, comprising a client device 2, a remote calculation server 3, and a processing unit 4 of a control authority.

The control authority can for example be a customs authority or a transport company. Typically, in a situation where an individual wants to board an aircraft, this can be an airline company.

The invention applies similarly to using any type of transport means. The access control of the individual verifies the right of the individual to enter a zone that is delimited by a control point generated by a control authority. This zone can be a country, or a boarding gate at an airport, etc.

The client device 2, the calculation server 3 and the processing unit 4 can be linked together by a communications network 5, for example an internet.

The client device 2 is advantageously an electronic device personal to an individual, for example of the mobile telephone, digital tablet, etc. type. This client device 2 is advantageously portable.

The client device 2 comprises a computer 20, such as for example a processor, a microprocessor, a controller, etc. The computer 20 is adapted to execute code instructions, preferably in the form of a software application downloadable from a server, for executing the process described hereinafter. The software application is preferably certified by a control authority.

It also comprises a module 21 for acquisition of a biometric datum on a biometric trait of an individual. The biometric trait can be the form of the face or one or more irises of the individual.

The acquisition module 21 of a biometric datum comprises an image sensor 22, and an image-processing module 23, which is adapted to extract a biometric datum from an image of a biometric trait. This module 23 is advantageously a series of instructions executable by the computer 20, for example a software module.

Extraction of the biometric datum is performed by processing the image of the biometric trait, which depends on the nature of the biometric trait.

A variety of image processing for extracting biometric data is known to the expert. By way of non-limiting example, in the event where the biometric trait is the facial image of the individual, extraction of the biometric datum can be done by application to the image of a convolutive grid of neurones (known by the acronym CNN for convolution neural network), previously loaded on a database.

Finally the client device 2 comprises a remote communications interface 24 with the remote calculation server 3 and if needed with the control unit 4. This interface is advantageously adapted to enable wireless communication with the remote server 3, for example via Wifi or Bluetooth or via a mobile telephone network (GPRS, 3G, 4G or other).

The client device 2 can also optionally communicate with the control unit 4 by means of an interface for displaying information 25 such as a monitor, displaying information to be sent to the control unit 4. Communication could also be made by means of a physical interface, such as for example an Ethernet link or a USB port, but since this type of communication is slower due to the need to make connections, it is less preferred.

Advantageously, though optionally, the client device 2 can finally comprise an information input interface 26 such as a keyboard, a touch screen, etc.

Finally, the client device 2 advantageously comprises a chip reader 27 of an identity document, typically a reader using near field communication technology of NFC (acronym for Near Field Communication).

The client device 2 also comprises a memory (not shown).

The remote calculation server 3 comprises a computer 30 adapted to make the calculations described hereinafter, and can be, for example, a processor, a microprocessor, a controller, etc. The remote calculation server 3 also comprises a remote communications interface 31 with the client device 2, adapted to run the same communication protocol as the interface 24 of the client device, that is, for example to communicate via Wifi, Bluetooth, or via a mobile telephone network (GPRS, 3G, 4G etc.).

The remote calculation server 3 also comprises, or can access, a memory 32 comprising a set of biometric reference data.

The processing unit 4 comprises a computer 40, for example of processor, microprocessor, controller, etc. type. It can comprise a communications interface 41 with the client device, which can be a remote communications interface, for example via Wifi, Bluetooth or via a telecommunications network, or a physical interface such as an Ethernet link or a USB port. The communications interface 41 can also be formed by a module for acquisition and processing of information displayed on a monitor of the client device.

Advantageously, the processing unit 4 controls a control point of an individual, which can be embodied by a barrier, a gantry, an indicator light etc. The control point constitutes an obstacle to access the zone, which is passed through only if the individual undergoes a successful check. For example, the control point can be a customs checkpoint located at the border of a state or in an airport.

The control point can also be a control point of a transport company such as an airline company, located in a boarding terminal and enabling the individual to access the transport means, for example the aircraft they are to board.

The processing unit can comprise a control interface 42 of the control point for authorising or prohibiting the individual to pass through the control point by opening/closing a barrier or a gantry or displaying information.

In the event where the communications interface 41 with the client device is a physical interface or a module for acquisition of information displayed on a monitor of the client device 2, this interface is arranged at the level of the control point. The computer 40 can be located at a distance from this interface, however.

The processing unit 4 can also comprise a module 43 for acquisition of a biometric datum, comprising an image sensor 44, and a module 45 for processing an image of a biometric trait to extract a biometric datum therefrom. This module is advantageously a series of instructions executable by the computer 40, for example a software module.

In reference to FIG. 2, a process of access control, which can be executed by the system described hereinbefore, will now be described.

The process comprises verification of the access right of the individual comprising comparison of a biometric datum acquired on the individual with a set of biometric reference data with the aim of detecting a correspondence between two data to determine that the individual corresponds to one of the individuals from whom the reference data have been acquired.

The result of this biometric verification is provided to a control authority, and in case of success the latter authorises the individual to pass through the control point.

As will be evident, the calculations for performing verification by comparison of the biometric datum of the individual with the reference data are shifted to the calculation server 3.

For this purpose, the process comprises a first series of steps 100 conducted before the individual presents at the control point. For example, these steps can be taken prior to or during arrival of an individual at a boarding terminal or a border checkpoint.

A first step 110 of this series comprises acquisition of a biometric datum on a biometric trait of the individual. This step is conducted by the client device 2. Preferably, in the event where the client device is a device personal to the individual, the individual performs this step themself by taking a photograph of their biometric trait, that is, for example their face or their iris. The image-processing module 23 of the client device 2 then processes the image to obtain a biometric datum b in the form of a vector comprising a set of components.

A second step 120 of the series 100 comprises transmission, via the client device 2 to the calculation server 3, of the acquired biometric datum b. This step is advantageously conducted securely to ensure confidentiality of the datum b. For example, communication can be secured by applying the protocol TLS (acronym of Transport Layer Security).

The calculation server 3 can then execute verification 130 of the access right of the individual, by comparison of the received biometric datum b to a set of biometric reference data $b_{ref}$. The biometric reference data $b_{ref}$ have been obtained on biometric traits of the same type as the biometric datum b. They are also vectors comprising a number of components identical to the number of components of the datum b.

Comparison is conducted conventionally per se by calculating a distance, between the biometric datum b and each biometric reference datum $b_{ref}$, for example by calculating a scalar product between the biometric data, and by comparing each distance to a predetermined threshold. In the event where a distance is under the threshold, a correspondence is detected between the biometric datum of the individual and one of the reference data. This information can suffice to determine that the individual has or does not have the right to pass through the control point, without the need to determine the identity of the individual. Consequently it suffices for the distance between the biometric datum of the individual and one of the biometric reference data to be under the threshold to consider that the individual has the right to access the zone and pass through the control point.

For verification to be completed successfully, the series of steps 100 has preferably been preceded by enrolment 50 of the individual with the calculation server 3, which can correspond to a registration step in the event where the individual is preparing to take transport means such as an aircraft. This step can have been made on the same day or on a previous day in any place, for example the residence of the individual.

This enrolment comprises sending by the client device 2 to the calculation server 3 of a biometric datum certified by a control authority, which is typically a biometric datum registered in the chip of an identity document such as a passport. This datum is acquired by way of the module 27 of the client device 2.

This biometric datum, which constitutes a biometric reference datum for the individual, is registered in the memory of the calculation server 3, and therefore then confirms the access right of the individual as it is normally sufficiently close to the biometric datum b acquired on the individual so that the distance with this datum is under the threshold for verification.

Advantageously, enrolment 50 also comprises sending to the calculation server 3 additional information such as for example the name of the individual, an identity document number, the nationality, optionally information on the transport means used or the trip reference (flight number, etc.). this different information performing security verifications on the individual, such as for example verification that the individual has the right to travel, cross the border of a country, etc.

In reference again to the biometric verification step 130 of the access right of the individual, the calculation server 3 conducts this step by executing a publicly verifiable zero-knowledge calculation protocol.

Since this calculation protocol is publicly verifiable, the calculation protocol produces proof that the calculation made between the biometric datum b and the biometric reference data $b_{ref}$ is exact, and allows anyone having access to the public verification key to verify the exactness of the result of the calculation.

Also, in a publicly verifiable calculation protocol the entity carrying out proof must provide the entity performing verification with the input data of its calculation so that the verification entity can study the validity of the proof. As described in more detail hereinafter, this would correspond here to providing inter alia the database of biometric reference data. However, since the calculation protocol is a zero-knowledge protocol, the confidentiality of this database is retained by proving that the entity providing proof has effectively has access to the database to execute the calculation protocol, and gives no information on the reference data contained in this database.

Advantageously, an embodiment of this protocol is the Pinocchio protocol presented in the publication "Bryan Parno, Craig Gentry, Jon Howell, and Mariana Raykova, Pinocchio: Nearly Practical Verifiable Computation, in Proceedings of the IEEE Symposium on Security and Privacy, IEEE, 21 May 2013", and which can be referred to for a complete description of the protocol.

In summary, the Pinocchio protocol comprises conducting the following steps.

The function F to be calculated (in this case calculation of each distance and comparison of each distance with the predetermined threshold) is represented in the form of an arithmetic circuit comprising only operators of addition and multiplication defined on a finished body $\mathbb{F}_p$.

Then a quadratic arithmetic program (or QAP for "Quadratic Arithmetic Program") is constructed from the arithmetic circuit. For this purpose, each multiplication operator of the arithmetic circuit is described by means of three polynoms respectively coding the two entries of the operator and the output of the operator (the addition operators being taken into account in the definition of polynoms). v, w, $\mathcal{Y}$ are designated as three sets of polynoms respectively encoding the two entries and outputs of the operators.

A fourth polynom called a target polynom T is built as follows:

$$T(x) = \Pi_G(x - r_G)$$

Where $r_G \in \mathbb{F}_p$ is an arbitrary root of an operator G of the arithmetic circuit.

The protocol Pinocchio is a zero-knowledge protocol by in that it adds to each polynom sets v, w, $\mathcal{Y}$ a random multiple of the target polynom T.

The sets of polynoms v, w, $\mathcal{Y}$ and the target polynom T form the QAP. Reference could be made to section 2.2.1. of the publication cited hereinbefore for more details in this respect.

These construction steps are preferably taken by the calculation server 3 to be pooled for several different client devices.

As described in detail in the publication cited hereinbefore, each polynom $V_k(x) \in \mathbb{F}_p[x]$ of the QAP is linked to an element $g^{v_k(s)}$ of a bilinear group where g is a generator of the group and s is a secret selected randomly.

A public evaluation key $EK_F$ and a public verification key $VK_F$ are built from these elements, for example by the calculation server 3.

The calculation server then uses the public evaluation key to evaluate the arithmetic circuit for the function F, and obtains a Boolean result y, the value of which indicates whether the biometric datum of the individual corresponds to at least one biometric reference datum, that is, whether the distance between the datum of the individual and at least one of the biometric reference data is under the predetermined threshold.

The calculation server also generates proof 7 of the result of calculation from the QAP, and therefore from the definition of the function F. By way of its construction (see also section 2.3 of the publication cited hereinbefore), the proof verifies that the result y has been obtained from the datum b.

The entity that has to verify the calculation—hereinafter, control authority—performs verification of the exactness of the calculation from the public verification key $VK_F$, of the biometric datum b, of proof π, and of the Boolean result y (reference could be made to section 2.3 of the publication cited hereinbefore for more details).

As a variant, another publicly verifiable zero-knowledge protocol and also usable within the scope of the invention is the Gepetto protocol, which is a variant of the Pinocchio protocol, and which has been presented in the publication "Craig Costello, Cedric Fournet, Jon Howell, Markulf Kohlweiss, Benjamin Kreuter, Michael Naehrig, Bryan Parno, and Samee Zahur, Geppetto: Versatile Verifiable Computation, in Proceedings of the IEEE Symposium on Security and Privacy, IEEE, 18 May 2015." This publication could be referred to for a detailed description of the implementation of this protocol.

Another publicly verifiable zero-knowledge protocol also usable in terms of the invention is that described in patent application FR1560942 filed on 16 Nov. 2015, in the event where the biometric data used for the access control are biometric data generated from images of irises of individuals.

In all cases, on completion of the protocol being carried out, the calculation server 3 has the result y of calculation of the function F, which is a Boolean indicating whether correspondence has been made between the individual and at least one individual enrolled in the database of biometric reference data, and proof π of the exactness of the result of the calculation.

The process then comprises a transmission step 140, by the calculation server 3 to the client device 2 of the result y and proof π of the exactness of the result of the calculation. This transmission can be made securely via the same secure communications channel as used in the step 120, though this is not necessary to the extent where the proof π comprises no explicit reference to the biometric reference data and the result y comprises only the information according to which the individual has been or not recognised as one of the individuals of the database of biometric reference data.

Even though performing the protocol to make the biometric comparison and calculate the proof needs a calculation time of the order of several minutes, the fact that this protocol is implemented by a remote calculation server and before the individual presents at the control point does not hinder the individual. Performing the protocol can in fact take place while the individual progresses in the direction of the control point and the individual can receive the elements sent by the calculation server 3 before arriving at the control point.

The process then comprises a second series of steps 200, which is performed when the individual presents themselves at the control authority's control point. This second series of steps consist of verification by a control authority that the biometric verification step 130 has been correctly conducted, and it is performed as follows.

During a step 210 the client device 2 sends the processing unit 4 of control authority the result y of calculation of verification, the biometric datum b having performed this verification, as well as proof π of the exactness of the result of the calculation.

These elements can be communicated to the processing unit by a wireless network of Wifi or telecommunications network type. As a variant they can be displayed on a monitor of the personal device, for example in the form of code, typically a bidimensional barcode. This code can be acquired by the interface 41 of the processing unit. They can alternatively be communicated via physical interfaces of the processing unit and of the control device.

Advantageously, though optionally, to lend the process additional security a fresh biometric datum b' is acquired on the individual by the processing unit 4 of control authority during the same step.

In this case, the process also comprises a step 220 of biometric authentication of the individual, conducted by the processing unit 4, by comparison of the biometric datum b with the fresh datum b'. This comparison ensures that the client device 2, which stores the data b, y and π communicated to the processing unit 4, has not been stolen from the individual who has been identified.

If authentication is satisfied, or in the absence of authentication, the process then comprises a verification step 230 of the exactness of the result of identification by the processing unit 4.

In the case of the Pinocchio protocol, this step is conducted by the public verification key $VK_F$, the proof π, the biometric datum b, and the Boolean result y (cf section 2.3 of the publication cited hereinbefore).

This verification step is conducted over a much shorter time than the time needed to verify that the individual belongs to the list of authorised individuals, typically under 0.1 second or even 0.05 second, whereas a conventional step for verification or biometric identification comprising acquisition of a fresh biometric datum takes time of the order of 20 seconds for an experienced user, the most time-consuming part being reading the data stored in a biometric passport.

Consequently the stop time of each individual at the control point is reduced and the length of the wait line at the control point is also reduced.

If the processing unit 4 determines that the verification 130 of the access right of the individual was performed exactly and the individual has an access right (by having a datum in the list of biometric reference data), it authorises 240 the individual to pass through the control point. For example, it can control the opening of a barrier or a gantry, or activate sending a sound or visual signal.

In the event where verification has not been done correctly or the individual has no access right, passing through the control point is prohibited 240 and the individual can be redirected for additional checks.

The invention claimed is:

1. A verification process of an access right of an individual to a zone delimited by at least one control point managed by a control authority, characterised in that before the individual presents themselves at the control point it comprises the following steps:
    acquiring, by a client device, a biometric datum on the individual and transmission of said datum to a remote calculation server,
    performing, by the remote calculation server, a zero-knowledge calculation protocol, which is also verifiable publicly, wherein the calculation protocol comprises:
        calculating a function comprising remote calculation between the biometric datum acquired on the individual and each of a plurality of biometric reference data, comparison of each distance from a predetermined threshold and generation of a result indicating whether at least one of the distances calculated is under said threshold, and
        generating from said function a proof of exactness of the calculation of the function,
    transmitting, by the remote calculation server to the client device, the result of calculation of the function and the proof of exactness of the calculation,
    and wherein the process comprises conducting the following steps, when the individual presents themselves at the control point:
    transmitting, by the client device to a processing unit of control authority, the biometric datum acquired on the individual, of the result of the calculation of the function and the proof of exactness of the calculation, and
    verifying, by the processing unit of control authority: the exactness of the result from said result the biometric datum and the proof.

2. The process as claimed in claim 1, wherein control authority authorises the individual to pass through the control point if the result of the calculation of the function is exact.

3. The process as claimed in claim 1, wherein the zero-knowledge calculation protocol is the protocol called Pinocchio or the protocol called Gepetto.

4. The process as claimed in claim 1, also comprising a preliminary enrolment step during which the client device sends to the remote calculation server at least one identity datum of the individual and one biometric datum of the individual certified by control authority, and the calculation server registers the biometric datum of the individual as biometric reference datum.

5. The process as claimed in claim 4, also comprising performing at least one security verification from the identity datum of the individual and/or of the biometric datum of the individual obtained from the identity document.

6. The process as claimed in claim 1, wherein transmitting the biometric datum acquired on the individual on the remote calculation server is performed securely.

7. The process as claimed in claim 1, wherein control authority is a customs authority or a transport company.

8. The process as claimed in claim 1, also comprising, when the individual presents themselves at the control authority's control point, a step during which the processing unit of control authority acquires a biometric datum on the individual and compares said datum to the datum sent by the client device, the verification step of the result of calculation of the function being conducted only when said data correspond.

9. A system for verification of an access right of an individual, comprising:
- a calculation server, comprising a computer and a remote communications interface, the computer being adapted to calculate a function comprising a remote calculation between at least two biometric data, and comparison of each distance to a predetermined threshold, and to generate proof of exactness of the calculation of the function,
- a processing unit adapted to perform verification of calculation of the function from the proof of exactness and the result of calculation, and
- a client device, adapted to acquire a biometric datum on an individual and to communicate with the calculation server and the processing unit,
- said system being adapted to execute the process as claimed in claim 1.

10. A computer program product, comprising code instructions stored on a non-transitory computer readable medium for executing a process comprising steps of:
- acquisition of an image of a biometric trait and generation from said image of a biometric datum acquired on an individual,
- transmission to a remote server of said biometric datum,
- receipt of a calculation result of a function by a remote server and proof of exactness of the result, said function comprising remote calculation between the biometric datum and each of a plurality of biometric reference data, comparison of each distance from a predetermined threshold and generation of a result using publicly verifiable zero-knowledge calculation protocol, indicating whether at least one of the distances calculated is under said threshold, and
- transmission of the biometric datum, of the calculation result and of the proof to a processing unit, when it is run by a computer.

* * * * *